Lewis D. Etherington Inventor

Lewis D. Etherington Inventor

Lewis D. Etherington Inventor
By J/C Small Attorney

United States Patent Office 2,710,668
Patented June 14, 1955

2,710,668

ADSORPTION PROCESS

Lewis D. Etherington, Bayonne, N. J., assignor to Esso Research and Engineering Company, a corporation of Delaware Application April 13, 1949, Serial No. 87,259

7 Claims. (Cl. 183—114.2)

This invention relates to an improved continuous adsorption process employing solid adsorbents for the fractionation of components of a gaseous mixture by countercurrent contact between the gaseous mixture and the solid adsorbent. Specifically, the invention is concerned with the control of temperature in such an adsorption operation. More particularly the invention is concerned with the removal of heat from an adsorption zone particularly in the vicinity of the gaseous mixture feed plate.

The fractionation of a gaseous mixture by causing it to flow upwardly through an adsorption zone where it contacts an adsorbent material such as charcoal, silica gel, etc. in small particle or powdered form which is passed downwardly through this zone has already been described. The adsorbent leaving the bottom of the adsorption zone is heated, with or without contact with a stripping gas such as steam, to desorb the adsorbed component of the gas which is separately recovered. The stripped adsorbent is then dehydrated, if desired or necessary, cooled, and returned to the top of the adsorption zone for re-use.

In previously described continuous processes for the adsorptive separation of gases, feed gas constituents are adsorbed and rectified into various fractions in a countercurrent tower operation. The "reflux" vapor, which is returned to the bottom of the lower rectification zone, plus the bottoms product are desorbed by combined steam stripping and heating, and the hot stripped solid is carried by recycled tower overhead (lift) gas to a single cooling unit before entering the top of the adsorption section of the column to repeat the cycle. The adsorption and rectifying tower sections therefore operate adiabatically except for a small heat loss to the surroundings.

It is an object of this invention to provide a continuous countercurrent adsorption process featuring reduced heat transfer surface requirements.

It is also an object of this invention to provide a continuous countercurrent adsorption process employing reduced solids circulation requirements.

These and other objects of this invention are accomplished by using several heat transfer units at different solids temperature levels and at different locations within and preceding the adsorption zone. It is a feature of this invention to remove heat from the adsorption zone particularly in the vicinity of the point of entry of the gaseous feed mixture. It is also a feature of this invention to provide in a continuous countercurrent adsorption process heat removal from the adsorption zone at two or more locations within said zone. It is an additional feature of this invention to provide heat removal throughout the adsorption zone or in each of the stages comprising the adsorption zone. Another feature of the present invention is the removal of heat from the rectification zone in the vicinity of the point of entry of the gaseous feed mixture.

For the purpose of the present invention, adsorption zone is defined as the adsorber section above the point of entry of the gaseous feed mixture which effects the substantially complete adsorption of intermediate and heavier feed gas constituents from the light feed gas fraction which passes overhead from the adsorber. Rectification zone is defined as an adsorber section below the point of feed gas entry in which less adsorbable feed fractions are stripped from more adsorbable feed fractions on the adsorbent by the action of upwardly flowing reflux vapor.

Data obtained on charcoal circulation and tower stage requirements for the adsorptive separation of $C_2$ and $C_3$ hydrocarbon fractions from petroleum refinery gas indicate that it is highly desirable to minimize the temperatures in certain sections of the adsorber, particularly in the vicinity of the point of feed gas entry, in order to minimize solid circulation requirements. For example, the bulk of the heavy ($C_3+$) material is adsorbed in the tower stage just above the point of feed gas entry, and the heat of $C_3+$ adsorption effects an appreciable additional increase in solids temperature. Charcoal adsorption capacity and selectivity (between $C_2$'s and methane in particular) are decreased due to the increased solids temperature, resulting in increased charcoal circulation and tower stage requirements. A study of the separation case mentioned above reveals that the adsorber tends to approach an equilibrium "pinch" condition first in the vicinity of the point of feed gas entry, due in large part to the displacement of adsorbed $C_1$ and $C_2$ by $C_3+$ and to the higher temperatures resulting from adsorption of the heavier material. Thus, it has been found that a lower adsorber temperature level in the vicinity of the point of feed gas entry to the column lowers solids circulation and tower stage requirements. However, above this section of the tower, in particular where negligible $C_3+$ is present, a higher temperature level would require a few additional stages but not necessarily any additional charcoal circulation.

An equilibrium pinch condition within an adsorption rectification tower, reference being made to a particular ratio of the two key components being separated, is defined as the condition wherein both the vapor leaving and the vapor entering a given separation stage are in equilibrium with the solid leaving said stage, the said pinch condition corresponding to an infinite number of required stages but the minimum required adsorbent circulation for a specified separation at fixed operating conditions of temperature, pressure, etc. Thus the minimum adsorbent circulation which corresponds to the pinch condition serves as a convenient guide to fix the optimum adsorbent circulation.

In previously described adsorption processes, which utilize only one adsorbent cooling unit and this unit installed above or preceding the effective adsorption zone, the temperature levels of the adiabatic adsorption and rectifying tower sections depend on the temperature of the solid leaving the cooler. That is, in effecting the total cooling at this location where the gas in contact with the adsorbent being cooled is comprised chiefly of the light adsorber overhead fraction of the feed mixture, removal of solids sensible heat represents the major portion of the cooling effected, and adsorption heat effects are small. However, in the adsorption and rectification zones below the cooler wherein the heavier, more adsorbable feed gas constituents concentrate, adsorption heats liberated are large and there is a gradual and appreciable increase in temperature of the solid as it moves downward from the cooler. Therefore, the adsorber temperature in the vicinity of the point of feed gas entry, which largely controls the required solid circulation rate, is considerably higher than the temperature of the solid leaving the cooler. For this type of process as described in the prior art, the considerations discussed above indicate the desirability of maximum adsorbent cooling before introducing the solid to the top of the adsorption zone in order to minimize solid circulation and stage requirements. However, a close approach of adsorbent temperature to that of the cooling water involves an excessive cooling surface requirement due to the small average temperature difference for heat transfer. The total heating and cooling requirements in adsorptive gas separations are large and heat transfer surface represents an appreciable portion of the total investment involved. A considerable reduction in surface requirements would therefore represent a substantial saving in adsorptive separation costs.

In comparison with the type of adsorption process previously disclosed and described above, in which the total cooling is effected at a location preceding the effective adsorption zone and consists chiefly of removing adsorbent sensible heat, it can be seen that the alternate method now being proposed of effecting at least a portion of the total cooling in the adsorption zone, particularly in the vicinity of the point of adsorber feed gas entry, offers decided advantages. By cooling in the adsorption zone wherein the more adsorbable feed gas constituents are in appreciable concentration, adsorption heat will comprise a substantial fraction of the total heat removed in this cooling zone. Therefore, for a given amount of heat removed, the drop in adsorbent temperature will be smaller, the average temperature differential for heat transfer to the coolant will be greater, and the required cooling surface will be less, as compared to the method previously disclosed. In addition, by effecting at least a portion of the total cooling in the effective adsorption zone, particularly in the vicinity of the point of feed gas entry to the adsorber, wherein appreciable adsorption heat as well as adsorbent sensible heat may be removed, more cooling may be effected per unit weight of adsorbent circulated (and with a moderate approach of the adsorbent to the coolant temperature) than possible by the previously disclosed method with a close approach of adsorbent to coolant temperature. Therefore, partial or total cooling within the adsorption zone may be applied to effect a reduction in required solids circulation as well as in required cooling surface.

In one phase of the present invention it is proposed to cool the adsorbent in at least two zones instead of one, in particular to remove heat from the adsorption zone in the immediate vicinity of the point of feed gas entry and to provide additional cooling preceding or in the upper section of the adsorption zone, in order to realize a decrease in cooling surface requirements and reduction in solids circulation rate with its attendant reduction in adsorption tower size, heating and cooling loads, heating surface, stripping steam, lift gas compression, etc.

Suitable apparatus for use in the process of this invention is shown diagrammatically in the attached drawings. The figures represent views in section elevation of apparatus adapted to carrying out the process of the invention.

Figure 1:
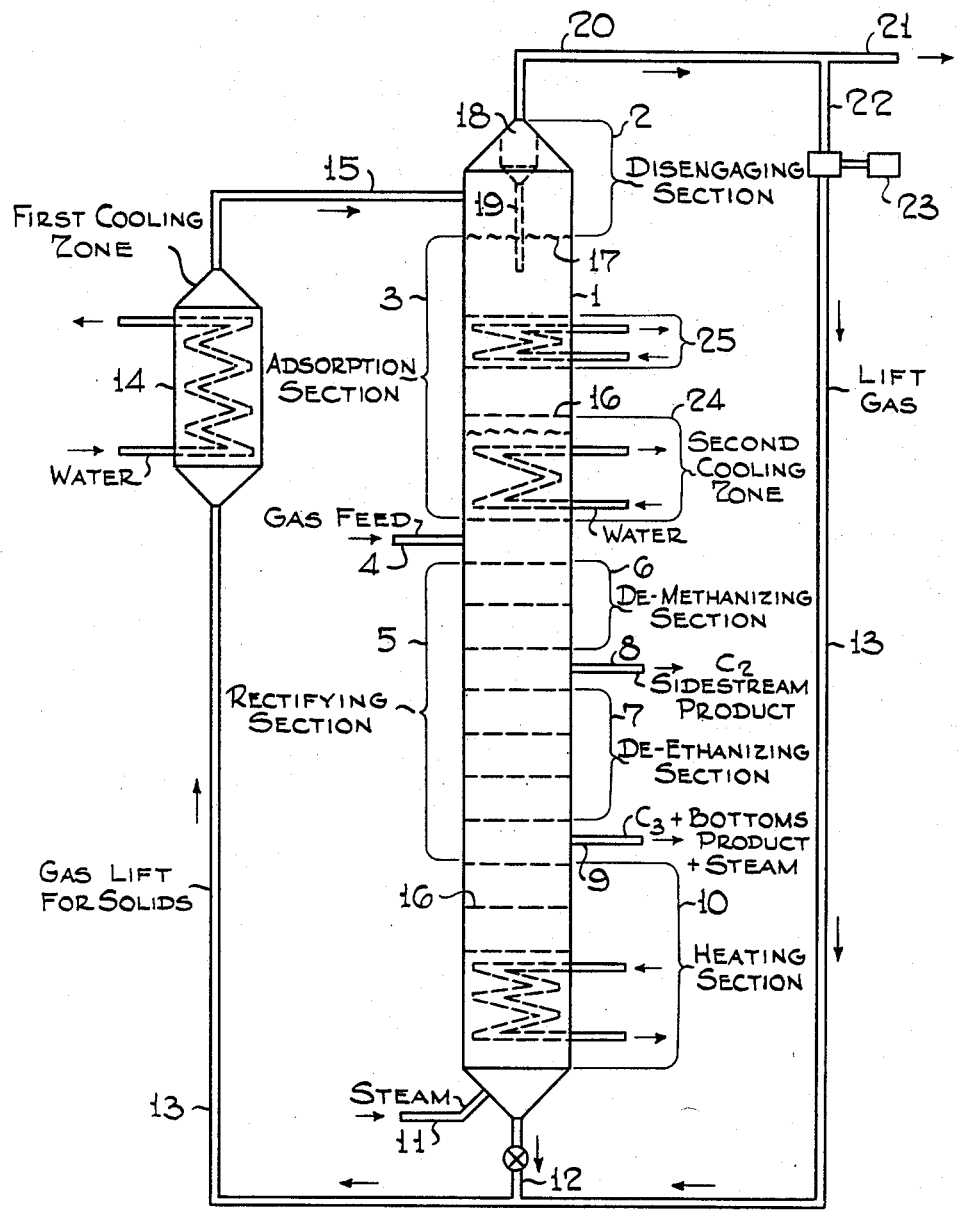
Figure 1 illustrates a continuous gas adsorption process with reduced cooling surface requirements.

Referring to Figure 1 the invention will be described for purposes of example only by the separation of $C_2$ and $C_3$ hydrocarbons from a mixture of $C_1$ to $C_3+$ and lighter gaseous components by means of charcoal adsorption. Numeral 1 represents an adsorption tower containing in descending order a tail gas removal line 20, an uppermost disengaging section 2, an adsorption section 3, a gas feed line 4, a rectification section 5 comprising a de-methanizing section 6 and a de-ethanizing section 7, a $C_2$ vapor removal line 8, a $C_3+$ vapor removal line 9, a desorber-heater section 10, a steam entry line 11 and a solids withdrawal line 12. The method by which the cooling is effected is demonstrated in the resolution by adsorptive separation of $C_2$ and $C_3$ hydrocarbon fractions from refinery fuel gas by means of activated charcoal. The feed gas comprising a mixture of methane, $C_2$, $C_3$ and heavier hydrocarbons, and less adsorbable gases such as nitrogen and hydrogen is introduced under pressure into the adsorption tower via line 4 at a point between the adsorption section and the rectification section. A mass of charcoal adsorbent cooled to approximately 160° F.–200° F. is introduced into the top of the adsorption section of the tower at the disengaging section via line 15. The adsorption tower may be operated as a soaker type reactor in which the tower is packed with solid adsorbent which gravitates slowly from the top to the bottom of the tower or the tower may operate with fluidized charcoal in which event the tower will contain trays 16 spaced at regular intervals upon which the charcoal will build up and reach a level indicated by the numeral 17. The adsorbent passes down the tower at such a rate that substantially all the $C_2$ and heavier hydrocarbons are selectively adsorbed on the adsorbent within the adsorption section while the methane and lighter components, e. g., nitrogen and hydrogen, pass overhead via cyclone 18 and leave the tower via line 20. Entrained charcoal is returned from cyclone 18 to the tower via dip-leg 19. The adsorbent passes down the tower into the rectification section 5 below the feed point.

In the upper part of the rectification area, i. e., in the de-methanizing section 6, any methane, nitrogen, hydrogen, etc. which may have remained on the adsorbent as it passes down through the tower are desorbed by the action of the refluxed $C_2+$ hydrocarbon vapors, which have been desorbed in the lower part of the rectification section, due to the more selective action of the charcoal for the heavier hydrocarbons. The displaced materials flow upwardly past the gas feed line 4 into the adsorber section and are eventually withdrawn from the system via line 20.

In the lower area of the rectification section 5 the adsorbent is refluxed with the heavier components of the hydrocarbon feed, for example, the $C_3+$ hydrocarbons similarly released in the lower section of the tower by the action of the desorber, whereby the desorption of the $C_2$ hydrocarbons is brought about. The $C_2$ hydrocarbons containing small equilibrium quantities of $C_3+$ hydrocarbons are removed in controlled amounts as a vapor stream from a point near the center of the rectification section via line 8 at a temperature of about 240° F.

The charcoal substantially free of $C_2$ and lighter components passes from the lowermost area of the rectification section 5 into the desorber 10. In the desorber desorption of the $C_3+$ hydrocarbons is accomplished by means of heat supplied indirectly to the enriched charcoal by suitable heating means such as by condensation of high-boiling liquid, by hot flue gas, etc. The action of the heat together with the stripping action of steam introduced via line 11 disengages the $C_3+$ hydrocarbons from the adsorbent and they pass upwardly through the desorber section with the product portion taken out through line 9 at a temperature of about 350° F. and the remaining portion returned as refluxed vapor to the bottom of the rectification section 5. The $C_3+$ product stream contains appreciable amounts of water vapor which may be removed therefrom by appropriate cooling or quenching operation.

Additional side streams representing one or more intermediate cuts may be obtained by expanding the rectifier section and removing, in addition to a more concentrated $C_3$ product, heavier hydrocarbons such as $C_4$ and $C_5$ side streams at lower points in the rectifier section. The major component of each additional side-stream would be contaminated chiefly with small equilibrium quantities of heavier material.

The hot stripped charcoal from the desorber-heater 10 at a temperature of about 500° F. is led via gas lift line 13 to a first cooling zone 14 in which the charcoal is partially cooled to a temperature in the range of 160° F. to 200° F., which does not approach too closely that of the water (90–110° F.) employed in the cooler. The partially cooled charcoal enters the top of the disengaging section 2 via line 15. In the disengaging section the recycled tail gas employed as lift gas plus the net tail gas overhead from the adsorption zone are removed via line 20 while the charcoal descends into the tower. The remaining charcoal cooling is carried out in a second zone 24 located within the adsorption section of the tower immediately above the point of feed entry where the bulk of the heavy ($C_3+$) material is adsorbed. The temperature of the adsorbent leaving the second cooling zone 24 is maintained at about 200° F. which corresponds to the temperature which would be reached at this point when cooling only in the first cooler 14 with the exit charcoal temperature closely approaching that of the cooling water. Thus, the same solids circulation is required for either case. However, by effecting the final cooling in the second cooler instead of removing the total heat in the first cooling zone, the average temperature difference between the charcoal and coolant is increased resulting in an appreciable saving in cooling surface. The adsorber temperature level above the second cooling zone will be higher and a few additional stages will be required in this section. However, it has been found that a higher temperature level in the area above the second cooler will not result in increased charcoal circulation requirements. Other cooling units, e. g., unit 25 located above the second cooling unit 24, may be employed if desired, to further reduce cooling surface and to reduce the required adsorption stages.

It should be noted that the first cooling zone 14 could also be located within the adsorption tower 1 at a point immediately below the disengaging section 2, that is, within the effective adsorption zone and comprising an extension of the adsorption zone 3. Also it should be noted that the first cooler 14 could be located within the adsorption tower 1 between the disengaging section 2 and the effective adsorption zone 3 as preceding the latter section, a location similar to that used in previously disclosed gas adsorption processes. That is, it may be desirable to remove a portion of tail gas fraction from the adsorber at a point immediately below the cooler 14, thus located, and substantially free of $C_2$ and heavier feed constituents, in which case, by definition, the cooler would be outside the effective adsorption zone. It should be further noted that, for the cooler 14 located in the upper section of the tower 1 as just described, a hot char dehydration zone could also be located in the upper section of tower 1, between the disengaging section 2 and the cooler 14, thus located, in order to countercurrently strip adsorbed and entrained stripping steam from the hot desorber char with all or a portion of the tail gas passing upwardly from cooler 14 thus located, as disclosed in previously described gas adsorption processes. In case dehydration of char leaving the desorber is desired or necessary and cooler 14 is located as indicated in Figure 1, an auxiliary tower or isolated extended section on the bottom of the desorber 10 may be provided in which all or a portion of the tail gas may be used to countercurrently strip steam from the char.

In the second phase of the present invention it is proposed to cool the charcoal adsorbent in two or more zones such that both solid circulation and cooling surface requirements are reduced. The method of effecting the cooling is demonstrated in Figure 2 with the same separation as previously described. As in Figure 1 the charcoal is cooled in the first cooling zone 14 and in a second cooling zone represented by one or more units 24 and 25 located above the gas feed plate, and in addition is cooled in the de-methanizing rectification section 6 by means of a third cooling zone 26 located immediately below the point of feed gas entry. Cooling in the de-methanizing section 6 in the vicinity of the feed gas entry is particularly effective in reducing char circulation requirements, while at the same time minimizing total cooling surface requirements, when adsorber conditions immediately below the feed gas entry point are more critical as controlling on char circulation requirements than conditions immediately above the feed entry point. In the first cooling zone 14 the hot char from the desorber at about 500° F. is cooled to approximately 160° F. and then fed to the top of adsorption zone 3. On descending in the adiabatic section of this zone the adsorbent temperature increases above the cooler 14 exit value due to the increase in concentration downward of the heavier more adsorbable feed gas constituents. Thus, having been cooled to about 160° F. in the first cooling zone 14, the char enters the second cooling zone at about 200° F. where it is cooled again to about 160° F. just above the point of feed entry. In the third cooling zone 26 heat of additional adsorption across the feed plate is removed in order to maintain the char at approximately 160° F. just below the point of feed gas entry.

If the char is cooled only in the first cooling zone 14 and to about 120° F. (closely approaching the cooling water temperature of about 100° F.), the adsorber temperature immediately above the feed entry point will be at about 200° F. and about 220° F. immediately below this point instead of 160° F. Thus, the use of the second and third cooling zones permits appreciably more cooling per unit weight of char circulated and much lower char temperatures in the vicinity of the feed plate than possible when using only the first cooler 14. On removing heat from the system in the vicinity of the feed entry point by means of the second and third cooling zones, the adsorbent capacity and selectively between $C_2$'s and methane improve appreciably. These effects tend to lower charcoal circulation requirements and also to reduce stage requirements for the rectification sections below the point of feed gas entry. At the same time, the average temperature difference for heat transfer to the cooling water is maintained at a high level and the total cooling surface requirements are minimized. Several cooling stages operating simultaneously as separation stages may be used immediately in the vicinity of the area below the gas feed line to comprise the third cooling zone 26. However, the installation of cooling surfaces at a point lower than one plate below the gas feed line is usually not preferred.

It should be noted that the use of first and second cooling zones only, as represented by Figure 1, are sufficient to maintain a much lower adsorber temperature level just below the feed entry point than possible when using the first cooling zone 14 only. However, in maintaining a given temperature level just below the feed point with the first and second cooling zones only, more surface is required than when using the third cooler 26 in Figure 2 in addition to the first and second cooling zones. For example, in maintaining the adsorber temperature at 160° F. immediately below the feed entry point as previously mentioned but using first and second cooling zones only, the char leaving the second cooling zone must be cooled to approximately 140° F., an appreciably lower temperature than allowable when using the third cooling zone 26 also. Thus more total cooling surface is required due to the lower char exit temperature from the second cooling zone.

Figure 2:
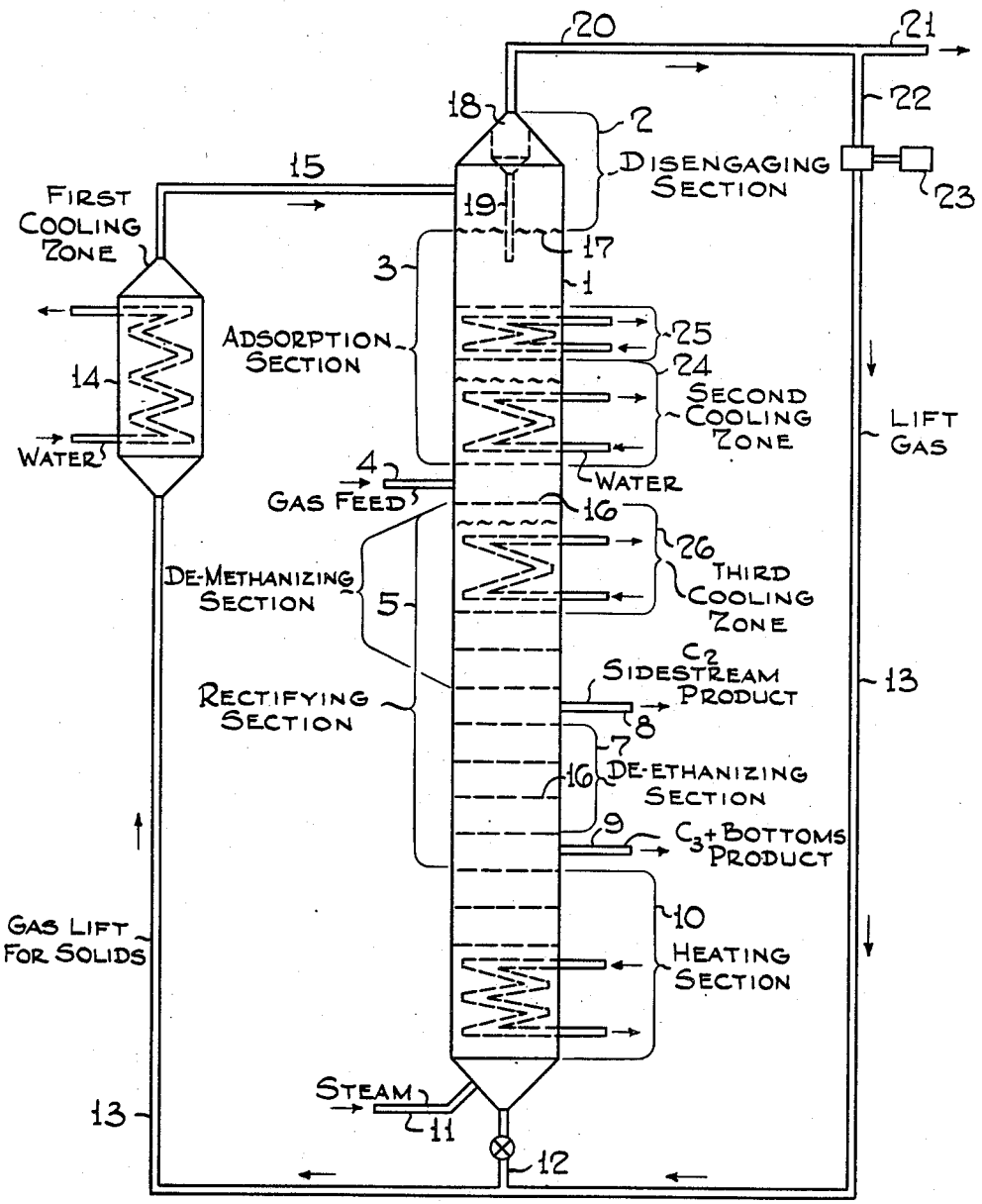
Figure 2 illustrates a continuous gas adsorption process both with reduced cooling surface requirements and with reduced adsorption circulation requirements.

It should be noted also that continuous cooling may be effected throughout the adsorption zone by means of the second cooling zone in the process represented by Figures 1 and 2. For example, when using fluidized charcoal which requires methods of staging such as plates in the adsorber, each of the adsorption stages may contain cooling coils immersed in the fluid solid bed on each plate. Thus, the first cooling zone may be eliminated and all the cooling effected by the second cooling zone extending throughout the adsorption zone (with each adsorption stage operating simultaneously as a cooling stage) and by the third cooling zone if desired. As another example, when using a moving-bed of closely-packed charcoal in the adsorber, the total cooling may be effected continuously and throughout the adsorption zone by means of the second cooling zone comprised of vertical tubes extending the total length of the adsorption zone and down to the point of feed entry, with char inside or outside the tubes and coolant on the opposite side. Multiple cooling units may comprise the second cooling zone with each unit consisting of one or more adjacent cooling stages operating simultaneously as adsorption stages and individual cooling units separated by adiabatic portions of the adsorption zone. Other modifications of the present invention will become apparent to those skilled in the art.

Figure 3:
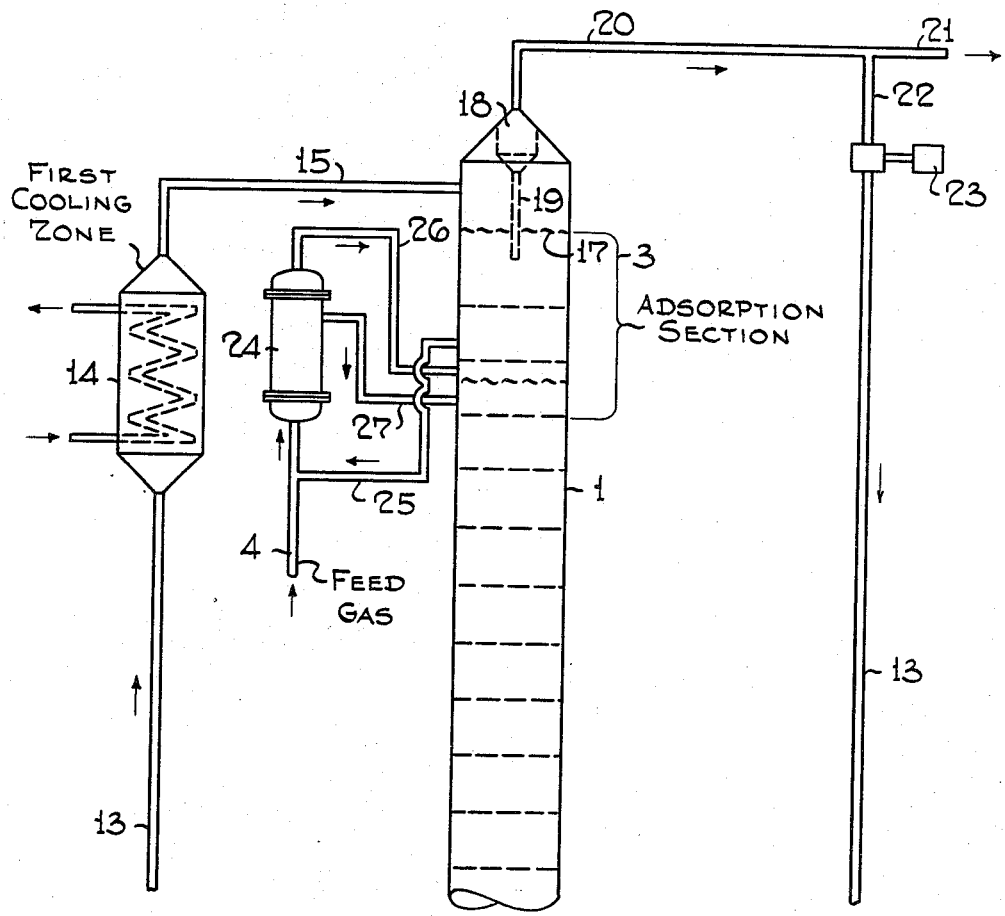
Figure 3 illustrates the same process in which the cooling surfaces are located externally to the adsorption tower.

Up to this point the second and third zone cooling has been illustrated as occurring only by means of internal coolers located within the adsorption tower itself. Figure 3 illustrates the process of the invention wherein the second and third zone cooling is carried out by means of external coolers. The design of the adsorption tower and related apparatus in Figure 3 is identical with that described in Figures 1 and 2 with the exception that the internal cooling units are replaced by external up-flow cooler 24. In operating the process according to the apparatus described in Figure 3 the hot charcoal is cooled by the first cooler 14 located in the charcoal lift line 13 and is fed as previously described via line 15 to the disengaging section at the top of the adsorption tower. Hot charcoal at a temperature of about 200° F. is withdrawn via line 25 from the adsorption tower at a point about two plates removed from the top. The withdrawn charcoal is carried up by means of the feed gas entering through line 4 and is passed upwardly through the external cooler 24 wherein the charcoal is reduced in temperature to about 150° F. The unadsorbed portion of the feed gas is taken overhead from the external cooler via line 26 and introduced into the adsorption tower at a point immediately below the plate from which the hot charcoal was removed. The cooled charcoal is withdrawn from the cooler at a point near the top thereof via line 27 and reintroduced into the adsorption tower on the plate immediately below that from which it was withdrawn. A similar external cooler may be installed to replace the third zone cooler 26 in the de-methanizing section below the gas feed line as described in Figure 2, using appropriate tower vapor as lift gas. It will also be apparent to those skilled in the art that a combination of external and internal coolers may also be employed. It should be noted that external solids up-flow coolers such as 14 and 24 may be staged, such as by perforated plate baffles, in order to further reduce cooling surface requirements.

By the term first zone cooling is meant the removal of heat (chiefly sensible heat) from the bulk of the hot charcoal removed from the bottom of the adsorption tower, before reintroduction of that charcoal into the top of the adsorption zone for repetition of the adsorption cycle. Thus, the charcoal is cooled in the first cooling zone in the presence of the less adsorbable feed gas constituents passing overhead from the adsorber. Second zone cooling refers to cooling in one or more units in the adsorption section above the gas feed line wherein both the sensible heat and adsorption heat removed are appreciable. Third zone cooling is that cooling carried out in the rectification section directly below the gas feed line wherein again both sensible heat and adsorption heat removed may be appreciable.

In each of the processes illustrated by the figures the tail gas emerging from the adsorption tower via line 20 is removed in part via line 21 as net product to a tail gas water scrubber or filter not illustrated where the remaining entrained charcoal of fine particle size is removed therefrom. A portion of the tail gas is removed via line 22, repressured by blower 23 and is employed as lift gas via line 13 to carry the desorbed hot charcoal through the first cooling zone and back into the adsorption tower.

It is understood that during the adsorption-desorption cycle some of the charcoal adsorbent will become deactivated thus requiring regeneration. The regeneration is carried out by conventional means and is not a part of this invention.

It is preferred to remove acidic gases such as carbon dioxide and hydrogen sulfide from the hydrocarbon feed to a charcoal adsorbent fractionation process by suitable pretreatment of the feed before it enters the adsorption zone in order to minimize metal corrosion and contamination of products.

When the system is operated employing a fluidized adsorbent in the adsorption tower the adsorbent is handled as a dense fluid bed in which the particles average approximately 50–200 micron particle size. The particles possess considerable motion relative to each other and plates or packing are required in the tower in order to effect sufficient countercurrent contact between the adsorbent and vapor. The tower may be supplied with perforated plates equipped with simple standpipe overflows, the vapor passing upwardly through the plate perforations at a velocity sufficiently high to prevent downward passage of charcoal therethrough, and to provide good solids fluidization. Packing or bubble cap plates can also be employed. Approximately 1 to 3 feet of dense bed and 2 feet of vapor disengaging space per plate are adequate to establish a satisfactory approach to equilibrium between vapor and solid. In the moving-bed type of operation the feed gas is fed to the tower at a point near the center thereof. The tower is packed with an adsorbent of approximately 10 to 30 mesh in size which in the case of charcoal would amount to a bulk density of about 30 lbs. per cubic ft. The tower is operated under a pressure of about 50 to 100 p. s. i. g. The packed adsorbent gravitates at a predetermined rate from the top to the bottom of the tower as previously described.

The charcoal inventory in a tower of a given diameter and height is much smaller when the adsorbent is fluidized than when it is handled as a moving bed, and fluidized solids permit much higher tower vapor velocities. Also much higher heat transfer coefficients are obtained with fluidized solids than with close packed solids.

The invention is generally applicable to fractionation processes of the type illustrated above, involving selective adsorption of one or more components from a mixture containing other components which are more or less readily adsorbed. In such operations it may be used to separate hydrocarbon mixtures into fractions of any desired boiling range or chemical structure by suitable selection of adsorbents and stripping agents in conformity with chromatographic principles. For example, paraffins, naphthenes, olefins, diolefins and aromatics may be obtained as separate fractions from mixtures of two or more of these classes of hydrocarbons with a silica gel adsorbent used in an adsorption process as described above in one or more stages according to the number of fractions to be separated. Similarly, organic vapors of different degrees of polarity may also be separated by selective adsorption on any suitable solid adsorbent.

The process is particularly applicable to the recovery of $C_2$ and $C_3$ hydrocarbons from refinery fuel gas; to the recovery of light ends from low pressure catalytic cracking gases; to the recovery of hydrocarbons and oxygenated compounds from hydrocarbon synthesis gas produced at low pressures; to the separation of methane from nitrogen; to the recovery of acetylene from the gases of the Wulff process; to the drying of light gases and air, and to the recovery of valuable solvents such as benzene from gases containing it.

Although the invention has been described with respect to the removal of heat from the solid adsorbent it is also to be understood that heat may also be removed from the vapors being treated in the respective zones. However, the removal of heat from the solid adsorbent is preferable to the cooling of the vapor.

Table 1 represents the mol percent composition of the various gas streams indicated for the separation of a methane fraction, a $C_2$ fraction, and a $C_3$ fraction from a hydrocarbon stream containing these gases.

Table II represents the saving in cooling surface, charcoal circulation rate and attendent reduction in charcoal heating, charcoal cooling, charcoal heating surface, lift gas compression, stripping stem. and tower size for the three-zone and two-zone cooling in comparison with first-zone cooling only, based on the adsorptive separation represented in Table I and on charcoal adsorbent handled as a fluidized solid in staged adsorber and heat exchanger equipment.

Table I

| Components | Feed Gas | Adsorber Overhead Product | $C_2$ Product | $C_3+$ Product |
|---|---|---|---|---|
| | Percent | Percent | Percent | Percent |
| Inert gas | 26.1 | 54.8 | | |
| $CH_4$ | 20.7 | 43.0 | 0.6 | |
| $C_2H_4$ | 19.4 | 1.4 | 47.0 | 0.2 |
| $C_2H_6$ | 18.1 | 0.8 | 44.4 | 0.3 |
| $C_3H_6$ | 9.9 | | 5.0 | 63.2 |
| $C_3H_8$ | 5.4 | | 3.0 | 33.2 |
| $C_4+$ | 0.4 | | | 3.1 |
| | 100.0 | 100.0 | 100.0 | 100.0 |
| Lb. Mols/hr | 3,335 | 1,588 | 1,326 | 421 |

Adsorption pressure=6 atmospheres absolute.
Feed Gas Temperature=120° F.

Table II

| | One Zone Cooling, Only | Two Zone Cooling, Fig. 1 | Three Zone Cooling, Fig. 2 |
|---|---|---|---|
| Average Cooling Water Temp °F | 100 | 100 | 100 |
| Adsorbent Temperature: | | | |
| Entering 1st Cooling Zone °F | 480 | 480 | 480 |
| Leaving 1st Cooling Zone °F | 120 | 200 | 160 |
| Entering 2nd Cooling Zone °F | | 250 | 215 |
| Leaving 2nd Cooling Zone (Entering Feed Plate) °F | | 200 | 160 |
| Leaving 3rd Cooling Zone (at feed plate) °F | | | 160 |
| Temp. at feed plate °F | 220 | 220 | 160 |
| Required Char Circulation, Tons/hr.[1] | 500 | 500 | 400 |
| Required Char Cooling Surface, sq. ft. | 22,000 | 10,000 | 12,000 |
| Required Char Heating, MM B. t. u./hr. | 120 | 120 | 105 |
| Required Char Cooling, MM B. t. u./hr. | 105 | 105 | 90 |
| Required Char Heating Surface, sq. ft. | 11,500 | 11,500 | 10,000 |
| Lift Gas Blower, Horse Power | 1,000 | 1,000 | 800 |
| Stripping Steam Requirement, #/hr | 40,000 | 40,000 | 32,000 |
| Adsorber Diameter (feet) | 11 | 11 | 10 |
| Required Stages in Adsorption Zone | 3 | 4 | 4 |
| Number of Stages used in First Cooling zone | 3 | 3 | 3 |
| Number of Adsorption Stages Cooled (Second Cooling Zone) | | 2 | 2 |
| Number of Rectification Stages Cooled (Third Cooling Zone) | | | [2] 1 |
| Required Stages in Rectification Zone | 10 | 10 | 9 |

[1] Taken as 130% of the minimum required char circulation rate for the above separation.
[2] Feed plate.

What is claimed is:

1. A process for the separation of components of a gaseous hydrocarbon mixture comprising methane, $C_2$ hydrocarbons and $C_3$ hydrocarbons by means of adsorption by a solid adsorbent which comprises passing the adsorbent downwardly through an adsorption zone having a staged adsorption section above the gaseous mixture feed-point thereto, and, below the feed-point, a middle rectification section wherein the adsorbent is refluxed with $C_2$ and $C_3$ hydrocarbons, and a communicating lower desorption section wherein the adsorbent is heated to release $C_3$ hydrocarbons, thereby providing reflux vapors for the rectification section, feeding the gaseous mixture to the adsorption zone, removing methane from an upper portion of the adsorption zone, cooling the adsorbent in the adsorption section in the stage immediately above the gaseous mixture feed point and in at least one other stage in the adsorption section, removing $C_2$ hydrocarbons as a vapor stream from the rectification section, heating the descending adsorbent in the desorption section to release $C_3$ hydrocarbons therefrom, passing a portion of the $C_3$ hydrocarbons as reflux to the rectification section, withdrawing the remainder of the $C_3$ hydrocarbons as a vapor stream from the desorption section, withdrawing hot adsorbent from the desorption section, cooling the withdrawn adsorbent and returning the cooled adsorbent to the adsorption section.

2. A process according to claim 1 in which the hot adsorbent in the adsorption section is cooled by indirect heat exchange.

3. A process according to claim 1 in which the hot adsorbent is withdrawn from the adsorption section, cooled and returned to the adsorption section at a point below the point of withdrawal.

4. A process according to claim 1 in which the hot adsorbent in the rectification section in the immediate vicinity of the gaseous mixture feed-point is also cooled.

5. A process according to claim 1 in which the adsorbent is activated carbon.

6. A process according to claim 1 in which the gaseous hydrocarbon mixture also contains gases less readily adsorbed than methane, and hydrocarbons heavier than $C_3$ hydrocarbons.

7. A process according to claim 1 in which the adsorbent is in a fluidized condition throughout the process.

References Cited in the file of this patent

UNITED STATES PATENTS

| 1,422,007 | Soddy | July 4, 1922 |
| 1,547,924 | Kerschbaum | July 28, 1925 |
| 1,661,149 | Barnebey | Feb. 28, 1928 |
| 1,667,426 | Lourens | Apr. 24, 1928 |
| 1,825,707 | Wagner, Jr. | Oct. 6, 1931 |
| 2,444,990 | Hemminger | July 13, 1948 |
| 2,470,438 | Jackson et al. | May 17, 1949 |
| 2,519,873 | Berg | Aug. 22, 1950 |
| 2,523,149 | Scheeline | Sept. 19, 1950 |
| 2,590,322 | Imhoff et al. | Mar. 25, 1952 |

OTHER REFERENCES

"Hypersorption Process . . . ," Clyde Berg; Transactions of A. I. Ch. E., vol. 42, No. 4, 1946, pages 665–680.